US006970408B2

(12) United States Patent
Ono

(10) Patent No.: US 6,970,408 B2
(45) Date of Patent: Nov. 29, 2005

(54) METHOD FOR DISCRIMINATING OPTICAL DISCS, AND OPTICAL DISC APPARATUS

(75) Inventor: Takayuki Ono, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 530 days.

(21) Appl. No.: 10/200,971

(22) Filed: Jul. 24, 2002

(65) Prior Publication Data

US 2003/0021207 A1    Jan. 30, 2003

(30) Foreign Application Priority Data

Jul. 30, 2001   (JP)   .......................... P. 2001-228920

(51) Int. Cl.[7] .............................................. G11B 7/00
(52) U.S. Cl. ............................... 369/53.23; 369/44.28; 369/53.45; 369/53.2
(58) Field of Search .......................... 369/53.2, 53.22, 369/53.23, 53.37, 53.41, 53.45, 44.28, 53.1

(56) References Cited

U.S. PATENT DOCUMENTS

| | | | | |
|---|---|---|---|---|
| 5,721,718 A | * | 2/1998 | Hwang | 369/53.23 |
| 5,774,438 A | * | 6/1998 | Park et al. | 369/53.23 |
| 5,909,419 A | * | 6/1999 | Kamiyama | 369/53.23 |
| 6,243,341 B1 | * | 6/2001 | Hasimoto | 369/53.22 |
| 6,304,535 B1 | * | 10/2001 | Magome et al. | 369/53.2 |
| 6,807,136 B1 | * | 10/2004 | Grimm | 369/53.2 |
| 6,816,443 B1 | * | 11/2004 | Hwang | 369/53.22 |

FOREIGN PATENT DOCUMENTS

| | | | | | |
|---|---|---|---|---|---|
| JP | 08036827 A | * | 2/1996 | | G11B 7/00 |
| JP | 08115525 A | * | 5/1996 | | G11B 7/09 |
| JP | 09017106 A | * | 1/1997 | | G11B 7/00 |
| JP | 9-44982 | | 2/1997 | | |
| JP | 09282784 A | * | 10/1997 | | G11B 19/12 |
| JP | 10-198985 | | 7/1998 | | |
| JP | 10-199122 | | 7/1998 | | |
| JP | 11213395 A | * | 8/1999 | | G11B 7/085 |

* cited by examiner

Primary Examiner—Gautam R. Patel
Assistant Examiner—Jorge L. Ortiz-Criado
(74) Attorney, Agent, or Firm—Morgan, Lewis & Bockius LLP

(57) ABSTRACT

An optical disc apparatus which is compatible with a compact disc (CD) and a Digital Versatile Disc (DVD) has a configuration of an optical pickup which performs a scanning operation in a focus-on and track-off state to read signals from an optical disc; an RF amplifier which, on the basis of the read signals, produces binary track-cross signals and binary mirror signals; a first edge counter which counts the number of the binary track-cross signals; a second edge counter which counts the number of the binary mirror signals; and a central processing unit (CPU) which discriminates between a CD or a DVD on the basis of a ratio between the number of the binary track-cross signals and the number of the binary mirror signals.

5 Claims, 8 Drawing Sheets

FIG. 1
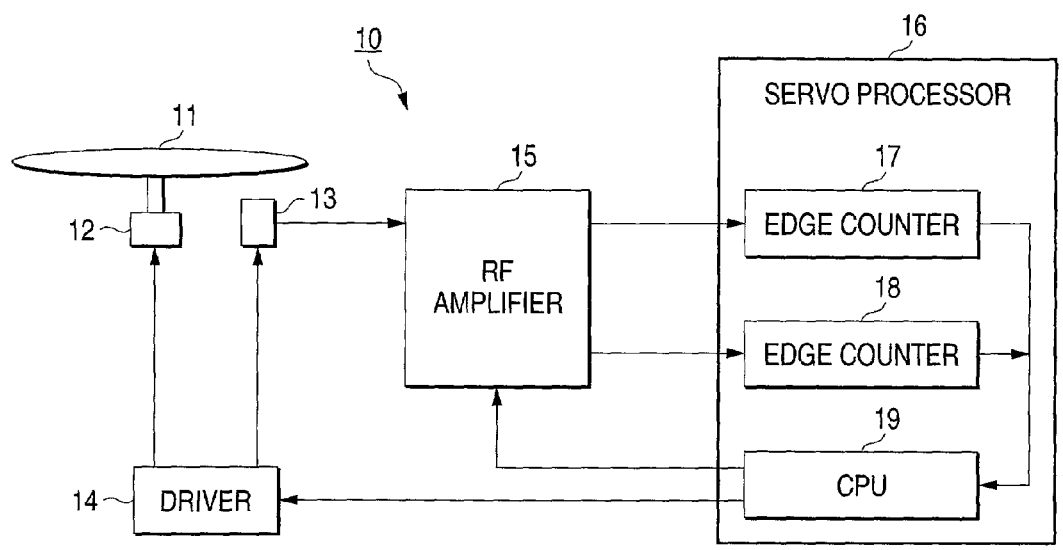
FIG. 2A
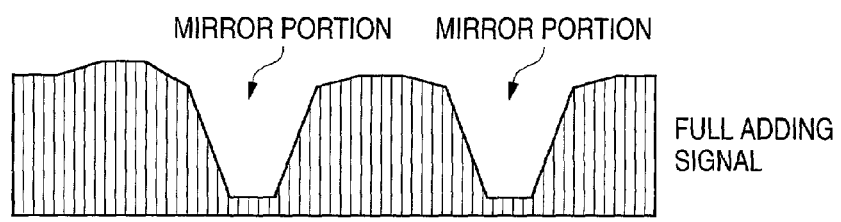
FULL ADDING SIGNAL
FIG. 2B
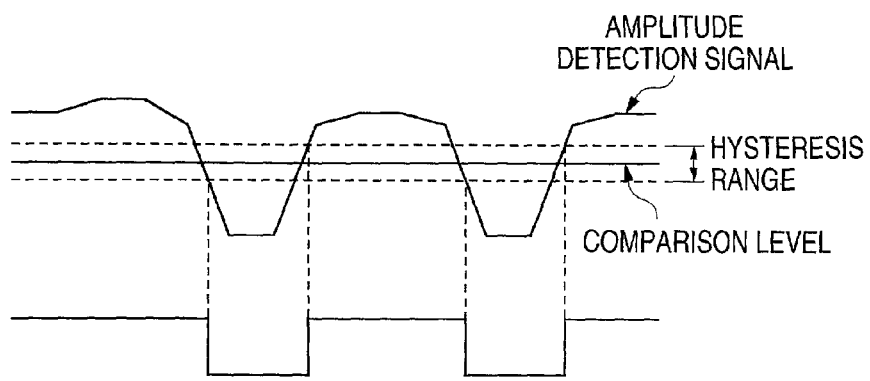
AMPLITUDE DETECTION SIGNAL
HYSTERESIS RANGE
COMPARISON LEVEL
FIG. 2C

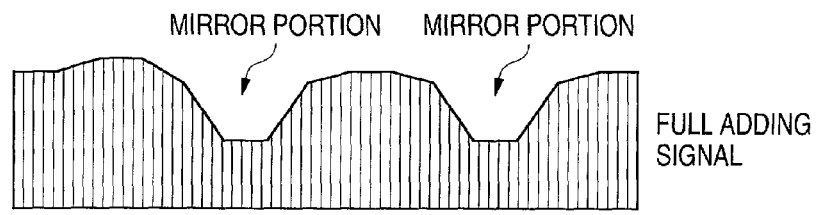
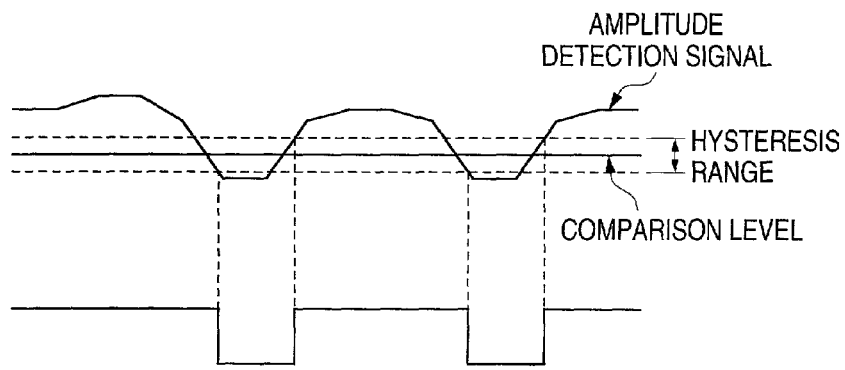
FIG. 3A, FIG. 3B, FIG. 3C
FIG. 4

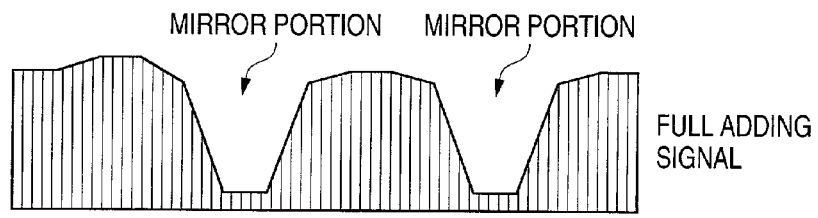
FIG. 10A
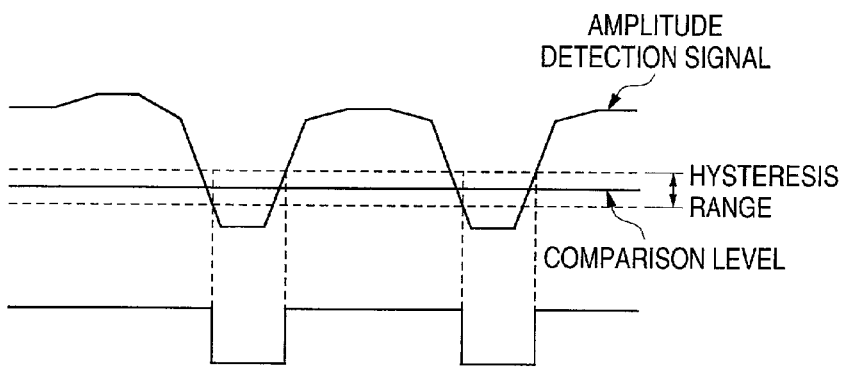
FIG. 10B
FIG. 10C
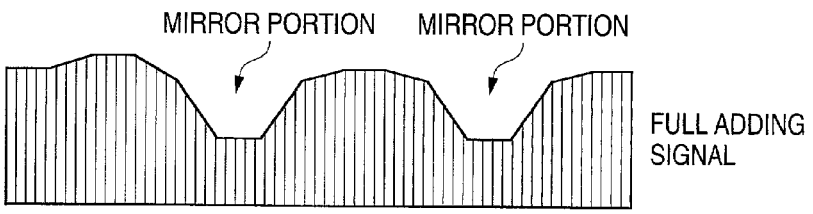
FIG. 11A
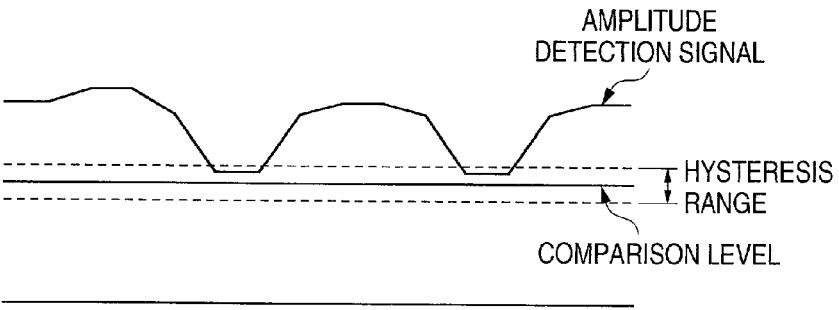
FIG. 11B
FIG. 11C

METHOD FOR DISCRIMINATING OPTICAL DISCS, AND OPTICAL DISC APPARATUS

BACKGROUND OF THE INVENTION

1. [Technical Field]

The present invention relates to a method of discriminating optical discs and an optical disc apparatus in which the kind of an optical disc is discriminated.

2. [Related Art]

Recently, a CD (Compact Disc) comes into widespread use as an optical disc. Discs of the CD system such as a music CD are used in various fields. Usually, a music CD is a playback-only medium. However, also a recordable disc which is called a CD-R is sometimes used as a music CD.

On the other hand, a DVD (Digital Versatile Disc) is known as an optical disc which is suitable for a multimedia application. A DVD is used in a wide variety of fields such as video data, audio data, and computer data. Although a DVD is a disc of the same size (diameter of 12 cm) as a CD, its storage capacity is increased by reduction of the pitch of recording tracks, a data compression technique, and the like.

At present, an optical disc apparatus which is compatible with both a CD and a DVD is being developed. Because of difference in the layer structure of a disc, a CD and a DVD are different from each other in reflectance. Depending on the kind of a disc, therefore, the level of an RF signal which is obtained by an optical pickup is changed, and also optimum values of parameters of various servo systems such as a focus servo system and a tracking servo system are changed.

Therefore, an optical disc apparatus which is compatible with plural kinds of optical discs must be configured so as to, when an optical disc is loaded, correctly discriminate the kind of the optical disc.

In a configuration where an optical disc is housed in a cartridge, discrimination can be easily made by, for example, forming an identification hole in the cartridge. In a configuration where optical discs are not housed in a cartridge and have the same size as in the case of a CD and a DVD, however, such a mechanical detection system cannot be employed. When special parts or mechanisms for discrimination, such as a sensor are disposed, the configuration is complicated and the production cost is increased. Therefore, such a countermeasure is not preferable.

The Unexamined Japanese Patent Application Publication Nos. Hei10-198985 and Hei10-199122 disclose an optical disc apparatus which discriminates between a CD and a DVD on the basis of the time difference between the time when focusing is obtained on the disc surface during a focus search, and that when focusing is obtained on the signal plane. The apparatus disclosed in the publications uses the configuration in which the distance between the surface of a CD and the signal plane is about 1.2 mm and that between the surface of a DVD and the signal plane is about 0.6 mm.

The Unexamined Japanese Patent Application Publication No. Hei9-44982 discloses a disc discriminating method in which a focus search is conducted and the kind of a disc is discriminated by measuring at least two time intervals in a reflected light amount signal.

In the techniques disclosed in the Unexamined Japanese Patent Application Publication Nos. Hei10-198985, Hei10-199122, and Hei9-44982, a track-on state must be set in order to conduct a focus search. In the case where discrimination is to be performed by means of a servo control in a DVD mode, when a CD is loaded, a servo control cannot be performed and discrimination sometimes fails.

SUMMARY OF THE INVENTION

In view of the above-discussed problem, it is an object of the invention to provide a method of discriminating optical discs in which the kind of an optical disc can be discriminated in a track-off state. It is another object of the invention to provide an optical disc apparatus which uses the method of discriminating optical discs.

In order to attain the object, the invention provides an optical disc apparatus which is compatible with a compact disc (CD) and a digital versatile disc (DVD), comprising an optical pickup which performs a scanning operation in a focus-on and track-off state to read signals from an optical disc; an RF amplifier which, on the basis of the read signals, produces binary track-cross signals and binary mirror signals; a first edge counter which counts a number of the binary track-cross signals; a second edge counter which counts a number of the binary mirror signals; and a central processing unit (CPU) which discriminates between a CD and a DVD on the basis of a ratio between the number of the binary track-cross signals and the number of the binary mirror signals.

A CD and a DVD can be discriminated in a track-off state because of the following reason. In a CD, less interference from an adjacent track occurs, and the amplitude of the produced full adding signal largely drops. By contrast, in a DVD, large interference from an adjacent track occurs, and the amplitude of the produced full adding signal slightly drops. Therefore, binary mirror signals in a DVD are detected more hardly than those in a CD.

The invention also provides a method of discriminating optical discs in which a kind of an optical disc is discriminated in an optical disc apparatus which is compatible with plural kinds of optical discs, the method comprising the steps of performing a scanning operation by an optical pickup in a focus-on and track-off state to read signals from an optical disc; producing track-cross signals and mirror signals on the basis of the read signals; counting a number of the track-cross signals, and a number of the mirror signals; and discriminating a kind of the optical disc on the basis of a ratio between the number of the track-cross signals and the number of the mirror signals.

A CD and a DVD can be discriminated by the method because of the following reason. In a CD, less interference from an adjacent track occurs, and the amplitude of the produced full adding signal largely drops. By contrast, in a DVD, large interference from an adjacent track occurs, and the amplitude of the produced full adding signal slightly drops. Therefore, mirror signals in a DVD are detected more hardly than those in a CD.

In the discriminating method, the scanning operation by the optical pickup may be performed by moving the optical pickup along a standing wave form with respect to a radial direction of the optical disc. According to the configuration, the f-characteristic of the produced full adding signal is lowered. In the case of a CD, even when the f-characteristic is lowered, mirror signals can be detected because the amplitude in a mirror portion largely drops. By contrast, in the case of a DVD, mirror signals are hardly detected because the amplitude is outside the hysteresis range of the comparison level when the f-characteristic is lowered. Therefore, the kind of an optical disc can be discriminated on the basis of a ratio between the number of the track-cross signals and the number of the mirror signals.

In the discriminating method, a comparison level may be lowered by a predetermined value in the step of producing the mirror signals. According to the configuration, in the case of a CD, mirror signals can be detected because the amplitude in a mirror portion largely drops. By contrast, in the case of a DVD, mirror signals are hardly detected because the amplitude is outside the hysteresis range of the comparison level. Therefore, the kind of an optical disc can be discriminated on the basis of a ratio between the number of the track-cross signals and the number of the mirror signals.

In the discriminating method, a hysteresis range of a comparison level may be increased by a predetermined value in the step of producing the mirror signals. According to the configuration, in the case of a CD, mirror signals can be detected because the amplitude in a mirror portion largely drops. By contrast, in the case of a DVD, mirror signals are hardly detected because the amplitude is outside the hysteresis range of the comparison level. Therefore, the kind of an optical disc can be discriminated on the basis of a ratio between the number of the track-cross signals and the number of the mirror signals.

The optical disc apparatus of the invention is characterized in that the apparatus comprises a unit which performs discrimination by any one of the above-mentioned methods of discriminating optical discs.

BRIEF DESCRIPTION OF THE DRAWINGS

FIG. 1 is a block diagram of main portions of the optical disc apparatus of the invention.

FIG. 2A is a view showing a full adding signal obtained when a CD is loaded, FIG. 2B is a view showing signals such as an amplitude detection signal, and FIG. 2C is a view showing MIs.

FIG. 3A is a view showing a full adding signal obtained when a DVD is loaded, FIG. 3B is a view showing signals such as an amplitude detection signal, and FIG. 3C is a view showing MIs.

FIG. 4 is a block diagram of production of the MIs in an RF amplifier in the invention.

FIG. 10A is a view showing a full adding signal obtained when a CD is loaded in Embodiment 2, FIG. 10B is a view showing signals such as an amplitude detection signal, and FIG. 10C is a view showing MIs.

FIG. 11A is a view showing a full adding signal obtained when a DVD is loaded in Embodiment 2, FIG. 11B is a view showing signals such as an amplitude detection signal, and FIG. 11C is a view showing MIs.

DETAILED DESCRIPTION OF THE PREFERRED EMBODIMENTS

<Configuration of Optical Disc Apparatus>

Figure 5:
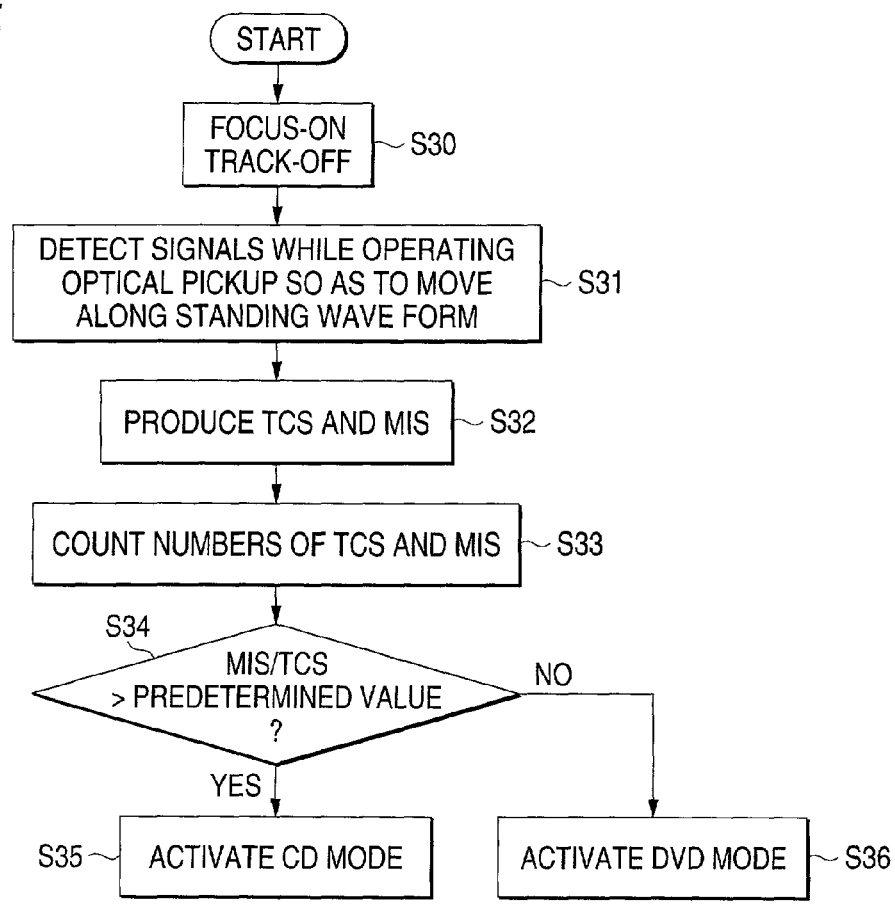
FIG. 5 is a flowchart showing the operation of an optical disc apparatus of Embodiment 1.

FIG. 1 is a block diagram of main portions of an optical disc apparatus 10. The reference numeral 11 denotes an optical disc which is a compact disc (CD) and a digital versatile disc (DVD), 12 denotes a spindle motor which rotates the optical disc 11, 13 denotes an optical pickup which reads out data recorded on the optical disc 11, and 14 denotes a driver which drives the spindle motor 12 and the optical pickup 13.

The reference numeral 15 denotes an RF amplifier which receives an electric signal from the optical pickup 13, and which produces signals such as an RF signal which indicates played-back data, a focus error signal for a servo control, a tracking error signal, a full adding signal, a binary track-cross signal (hereinafter, abbreviated to TC), and a binary mirror signal (hereinafter, abbreviated to MI). The TC is produced by comparing the tracking error signal with the zero level, and the MI is produced by comparing the full adding signal with a predetermined threshold.

The reference numeral 16 denotes a servo processor which receives the signals from the RF amplifier, which processes the signals to discriminate whether the currently loaded optical disc 11 is a CD or a DVD, and which controls the RF amplifier 15 and the driver 14. The servo processor is configured by an edge counter 17 which counts edges of TCs to calculate the number of the TCs, an edge counter 18 which counts edges of MIs to calculate the number of the MIs, and a central processing unit (CPU) 19 which receives signals from the edge counters 17 and 18 and controls the RF amplifier 15 and the driver 14.

<Method of Discriminating Optical Discs>

Next, a method of discriminating whether the loaded optical disc 11 is a CD or a DVD in the optical disc apparatus 10 will be described. In a focus-on and track-off state, the optical pickup 13 performs a scanning operation in a radial direction of the optical disc 11 for a predetermined time period. Then, the RF amplifier 15 produces the TCs and the MIs, the edge counter 17 counts the number of the TCs, and the edge counter 18 counts the number of the MIs. The CPU 19 calculates a ratio of MIs/TCs which is a ratio of the numbers of the signals. If the ratio is larger than a predetermined value, it is judged that the optical disc is a CD, and, if the ratio is not larger than the predetermined value, it is judged that the optical disc is a DVD.

The spot diameter of a laser beam of the optical pickup 13 can be calculated by $1.22\lambda/NA$ where $\lambda$ is the frequency of the laser beam and NA is the numerical aperture. With respect to a laser beam for a CD, $\lambda=0.78$ ($\mu$m) and NA=0.45, and hence the spot diameter is about 2.1 $\mu$m. With respect to a laser beam for a DVD, $\lambda=0.65$ ($\mu$m) and NA=0.6, and hence the spot diameter is about 1.3 $\mu$m.

In a CD, the track pitch is 1.6 $\mu$m, and, in a DVD, the track pitch is 0.74 $\mu$m. A ratio of the spot diameter to the track pitch is calculated as follows:

In the case of a CD, the ratio is $$2.1(\mu m)/1.6(\mu m) \times 100 = 131(\%), \text{ and,}$$

in the case of a DVD, the ratio is $$1.3(\mu m)/0.74(\mu m) \times 100 = 175(\%).$$

Therefore, the ratio by which the laser beam for a CD protrudes from a track is smaller than that by which the laser beam for a DVD protrudes from a track, and hence interference from an adjacent track in a CD is smaller in degree.

In FIG. 2, FIG. 2A shows the full adding signal obtained when a CD is loaded, FIG. 2B shows signals such as an amplitude detection signal, and FIG. 2C shows the MIs, and, in FIG. 3, FIG. 3A shows the full adding signal obtained when a DVD is loaded, FIG. 3B shows signals such as an amplitude detection signal, and FIG. 3C shows the MIs. FIG. 4 is a block diagram of production of the MIs in the RF amplifier 15.

The full adding signal of the signals which are detected by the optical pickup 13 is taken out as the amplitude detection signal by an amplitude detection circuit 20, and noises are removed away from the amplitude detection signal in a fast LPF circuit 21. An output of the fast LPF circuit is compared with an output which has been passed through a slow LPF 23 of a slow time constant while selecting a predetermined threshold in a threshold selection circuit 22. As a result, when the optical pickup is on a track, the MI of "L" is output, and, when the optical pickup is on a mirror portion between tracks, the MI of "H" is output. As shown in FIGS. 2B and 3B, usually, the comparison level which is used in the MI detection is set to a position where the MI detection is enabled for both a CD and a DVD, and has a predetermined hysteresis range.

In a CD, less interference from an adjacent track occurs. When the optical pickup 13 approaches a mirror portion, therefore the amplitude of the full adding signal largely drops as shown in FIG. 2A. By contrast, in a DVD, large interference from an adjacent track occurs. Even when the optical pickup 13 approaches a mirror portion, therefore, the dropping of the amplitude of the full adding signal is smaller in degree than that in the case of a CD as shown in FIG. 3A. Consequently, the MI detection in a DVD is more disadvantageous than that in a CD. In the following embodiments, a method of discriminating between a CD and a DVD by using a method of making more conspicuous the characteristics of the MI detection will be described.

<Embodiment 1>

Figure 6:
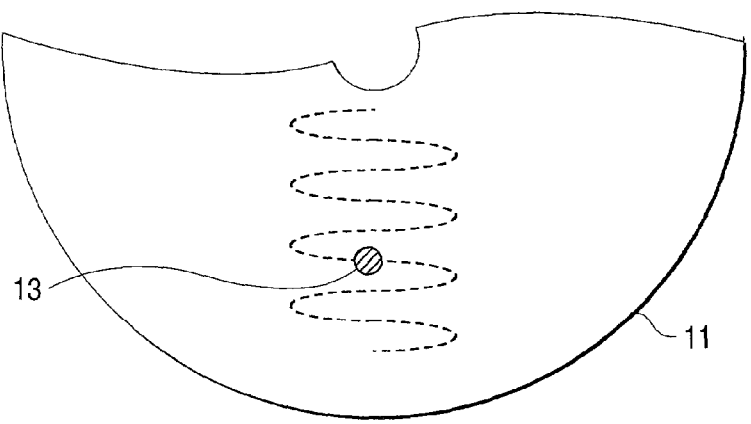
FIG. 6 is a view showing an optical pickup which performs a scanning operation on a signal plane of an optical disc in Embodiment 1.

FIG. 5 is a flowchart showing the operation of the optical disc apparatus 10 of Embodiment 1. When the optical disc 11 is loaded into the optical disc apparatus 10, the optical pickup 13 is first set in step S30 to a focus-on and track-off state. The control then advances to step S31 to detect signals by driving the optical pickup 13 in a radial direction of the optical disc 11, and operating the optical pickup in the circumferential direction of the optical disc 11 with predetermined amplitude and period. Specifically, signals are detected while the optical pickup 13 is operated so as to move along a standing wave form with respect to the optical disc 11 as indicated by the broken line in FIG. 6. As the standing wave form, for example, a sinusoidal wave form or the like may be used.

The control advances from step S31 to step S32 to produce the TCs and the MIs in the RF amplifier 15 on the basis of the detected signals. The control then advances to step S33 so that the edge counters 17 and 18 count the numbers of the TCs and the MIs which are obtained for the predetermined time period, respectively. The control then advances to step S34 in which the CPU 19 calculates the ratio of MIs/TCs from the counted numbers of the TCs and the MIs, and judges whether the ratio is larger than the predetermined value or not.

If the ratio of MIs/TCs is larger in step S34 than the predetermined value, it is judged that the optical disc is a CD, and the control advances to step S35 to activate a CD mode. By contrast, if the ratio of MIs/TCs is not larger in step S34 than the predetermined value, it is judged that the optical disc is a DVD, and the control advances to step S36 to activate a DVD mode.

Figure 7A:
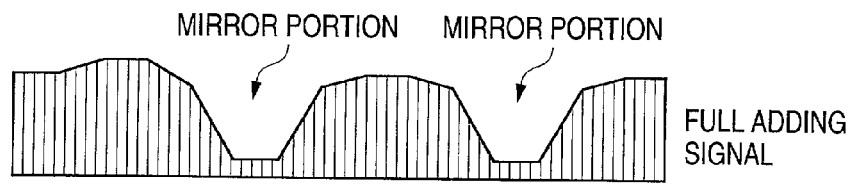
FIG. 7A is a view showing a full adding signal obtained when a CD is loaded in Embodiment 1.
Figure 7B:
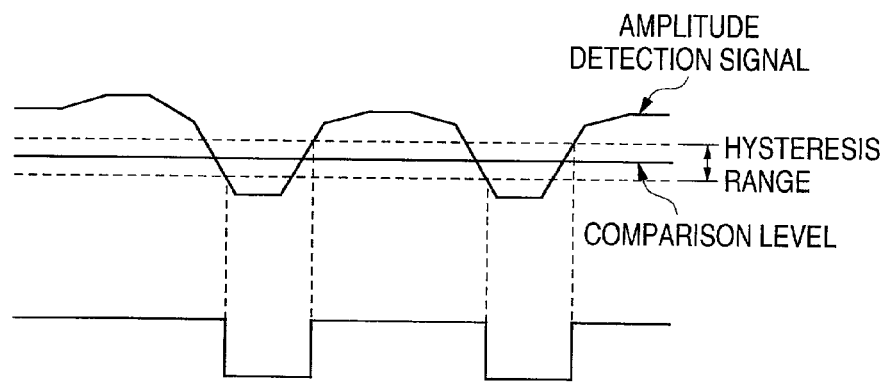
FIG. 7B is a view showing signals such as an amplitude detection signal.
Figure 7C:
FIG. 7C is a view showing MIs.
Figure 8A:
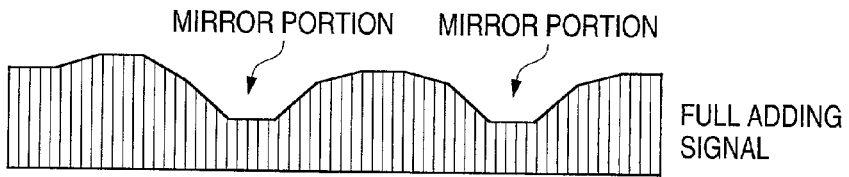
FIG. 8A is a view showing a full adding signal obtained when a DVD is loaded in Embodiment 1.
Figure 8B:
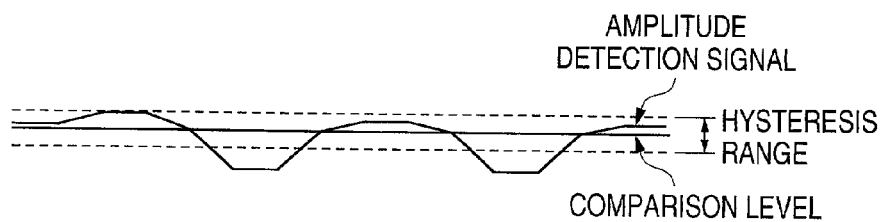
FIG. 8B is a view showing signals such as an amplitude detection signal.
Figure 8C:
FIG. 8C is a view showing MIs.

In FIG. 7, FIG. 7A shows the full adding signal obtained when a CD is loaded, FIG. 7B shows signals such as an amplitude detection signal, and FIG. 7C shows the MIs, and, in FIG. 8, FIG. 8A shows the full adding signal obtained when a DVD is loaded, FIG. 8B shows signals such as an amplitude detection signal, and FIG. 8C shows the MIs.

In Embodiment 1, the signals are detected while the optical pickup 13 is operated so as to move along a standing wave form with respect to the optical disc 11, and hence the f-characteristic (frequency axis characteristic waveform) of the produced full adding signal is lowered as compared with the case where the optical disc is linearly operated, as shown in FIGS. 7A and 8A. In the case of a CD, even when the f-characteristic is lowered, therefore, the MIs can be detected because the amplitude in a mirror portion largely drops as shown in FIG. 7B. By contrast, in the case of a DVD, the MIs are hardly detected because the amplitude is outside the hysteresis range of the comparison level when the f-characteristic is lowered, as shown in FIG. 8B. As a result, the ratio of MIs/TCs in a CD is large, and that in a DVD is small, so that, when the predetermined value is set to an adequate one (for example, 0.5), it is possible to discriminate the kind of the optical disc 11.

<Embodiment 2>

Figure 9:
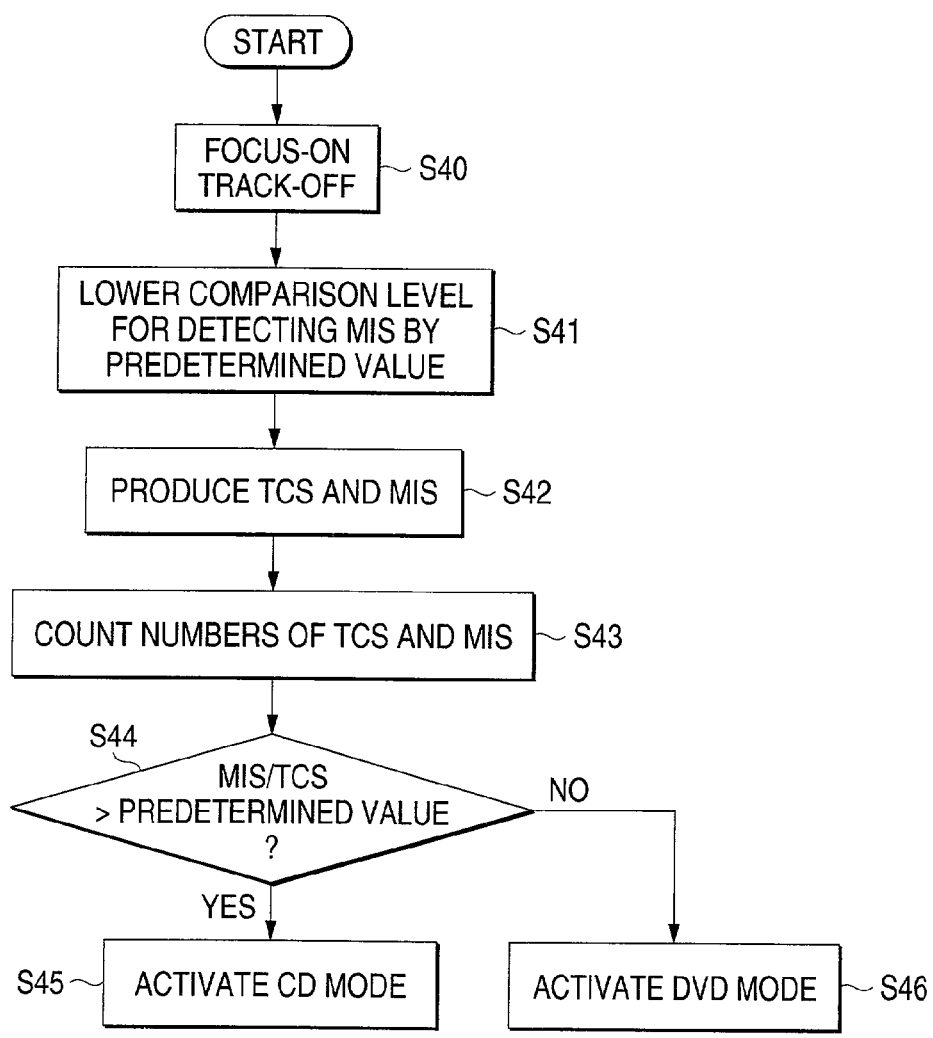
FIG. 9 is a flowchart showing the operation of an optical disc apparatus of Embodiment 2.

FIG. 9 is a flowchart showing the operation of the optical disc apparatus 10 of Embodiment 2. When the optical disc 11 is loaded into the optical disc apparatus 10, the optical pickup 13 is first set in step S40 to a focus-on and track-off state. The control then advances to step S41 in which signals are detected by the RF amplifier 15 and the comparison level for detecting the MIs is lowered by the predetermined value. The following steps or steps S42 to S46 are identical with steps S32 to S36 of FIG. 5.

In FIG. 10, FIG. 10A shows the full adding signal obtained when a CD is loaded, FIG. 10B shows signals such as an amplitude detection signal, and FIG. 10C shows the MIs, and, in FIG. 11, FIG. 11A shows the full adding signal obtained when a DVD is loaded, FIG. 11B shows signals such as an amplitude detection signal, and FIG. 11C shows the MIs.

In Embodiment 2, the comparison level for detecting the MIs is lowered. In the case of a CD, therefore, the MIs can be detected because the amplitude in a mirror portion largely drops as shown in FIG. 10B. By contrast, in the case of a DVD, the MIs are hardly detected because the amplitude is outside the hysteresis range of the comparison level as shown in FIG. 11B. As a result, the ratio of MIs/TCs in a CD is large, and that in a DVD is small, so that, when the predetermined value is set to an adequate one (for example, 0.5), it is possible to discriminate the kind of the optical disc 11.

<Embodiment 3>

Figure 12:
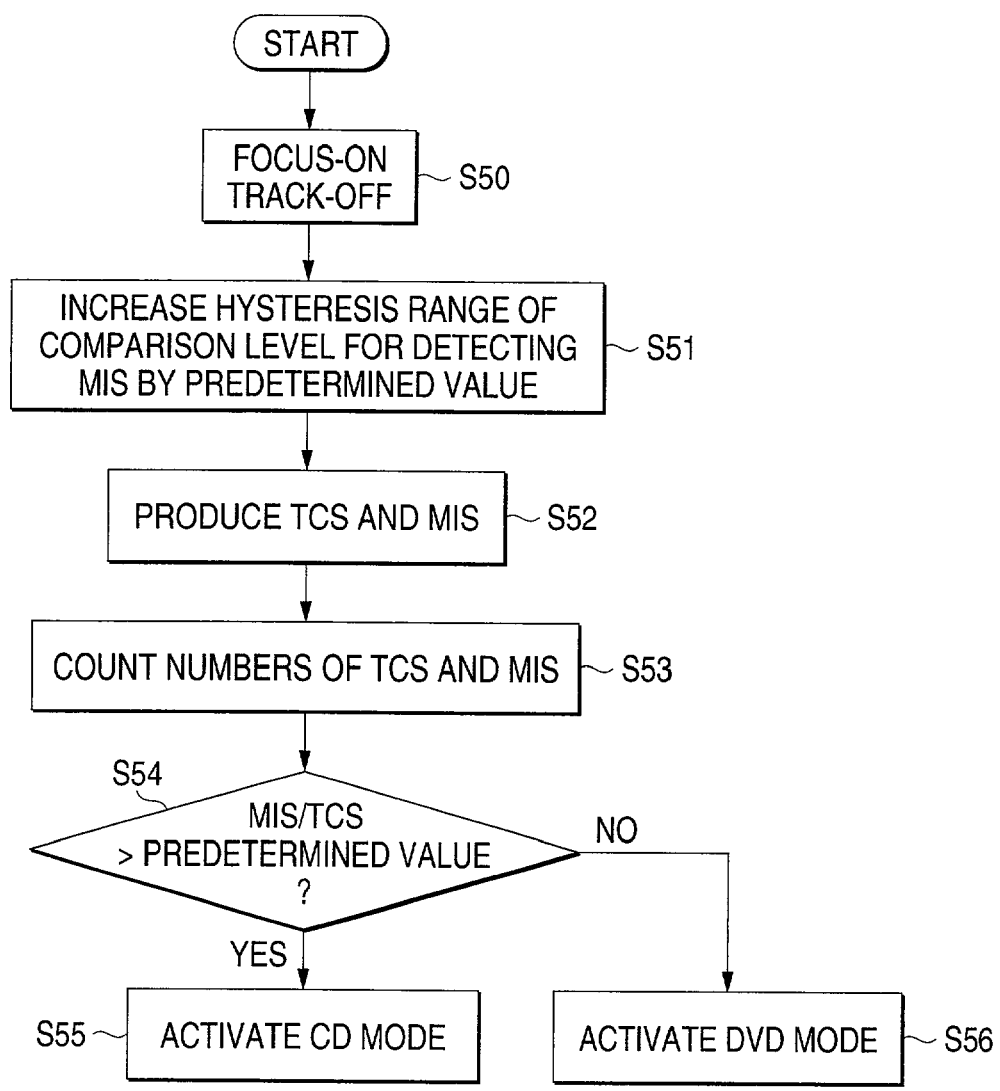
FIG. 12 is a flowchart showing the operation of an optical disc apparatus of Embodiment 3.

FIG. 12 is a flowchart showing the operation of the optical disc apparatus 10 of Embodiment 3. When the optical disc 11 is loaded into the optical disc apparatus 10, the optical pickup 13 is first set in step S50 to a focus-on and track-off state. The control then advances to step S51 in which signals are detected by the RF amplifier 15 and the hysteresis range of the comparison level for detecting the MIs is increased by the predetermined value. The following steps or steps S52 to S56 are identical with steps S32 to S36 of FIG. 5.

Figure 13A:
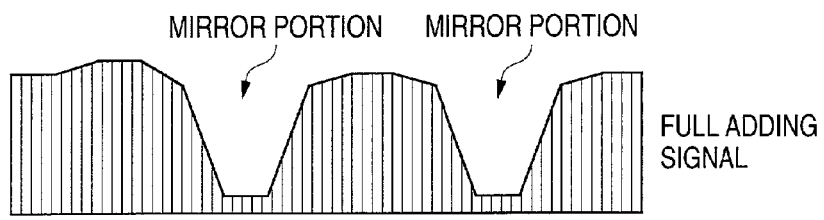
FIG. 13A is a view showing a full adding signal obtained when a CD is loaded in Embodiment 3.
Figure 13B:
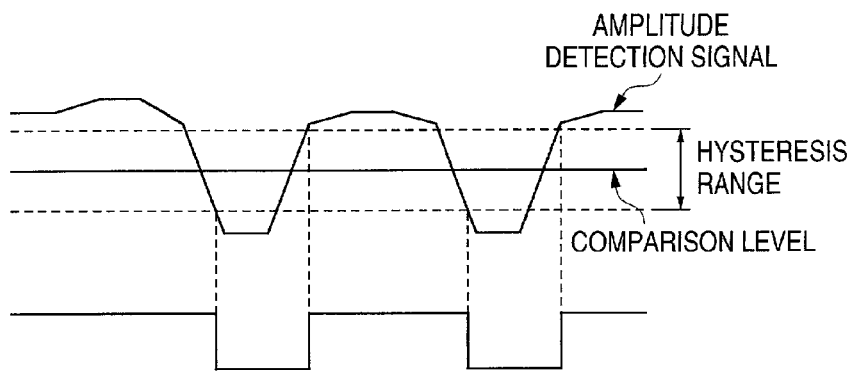
FIG. 13B is a view showing signals such as an amplitude detection signal.
Figure 13C:
FIG. 13C is a view showing MIs.
Figure 14A:
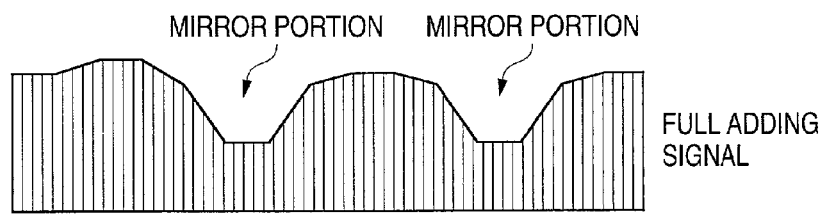
FIG. 14A is a view showing a full adding signal obtained when a DVD is loaded in Embodiment 3.
Figure 14B:
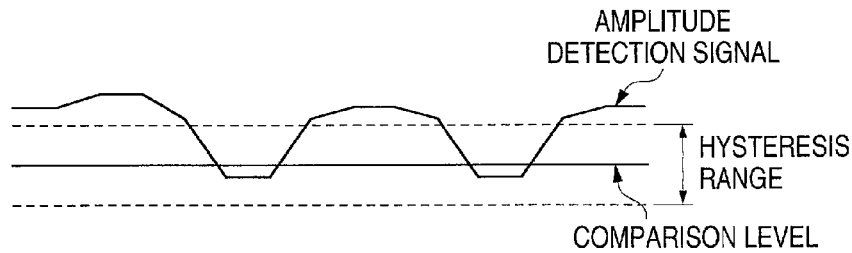
FIG. 14B is a view showing signals such as an amplitude detection signal.
Figure 14C:
FIG. 14C is a view showing MIs.

In FIG. 13, FIG. 13A shows the full adding signal obtained when a CD is loaded, FIG. 13B shows signals such as an amplitude detection signal, and FIG. 13C shows the MIs, and, in FIG. 14, FIG. 14A shows the full adding signal obtained when a DVD is loaded, FIG. 14B shows signals such as an amplitude detection signal, and FIG. 14C shows the MIs.

In Embodiment 3, the hysteresis range of the comparison level for detecting the MIs is increased by the predetermined value. In the case of a CD, therefore, the MIs can be detected as shown in FIG. 13B. By contrast, in the case of a DVD, the MIs are hardly detected because the amplitude is outside the hysteresis range of the comparison level as shown in FIG. 14B. As a result, the ratio of MIs/TCs in a CD is large, and that in a DVD is small, so that, when the predetermined value is set to an adequate one (for example, 0.5), it is possible to discriminate the kind of the optical disc 11.

According to the invention, an optical pickup performs a scanning operation in a focus-on and track-off state to read signals from an optical disc, track-cross signals and mirror signals are produced, the numbers of the track-cross signals and mirror signals are counted, and the kind of the optical disc is discriminated on the basis of a ratio between the number of the track-cross signals and that of the mirror signals, thereby enabling the kind of the optical disc to be discriminated in a track-off state.

What is claimed is:

1. An optical disc apparatus which is compatible with a compact disc (CD) and a digital versatile disc (DVD), comprising:
   an optical pickup which performs a scanning operation in a focus-on and track-off state to read signals from an optical disc;
   an RF amplifier which, on the basis of the read signals, produces binary track-cross signals and binary mirror signals;
   a first edge counter which counts a number of the binary track-cross signals;
   a second edge counter which counts a number of the binary mirror signals; and
   a central processing unit (CPU) which discriminates between a CD and a DVD on the basis of a ratio between the number of the binary track-cross signals and the number of the binary mirror signals.

2. A method of discriminating optical discs in which a kind of an optical disc is discriminated in an optical disc apparatus which is compatible with plural kinds of optical discs, said method comprising the steps of: performing a scanning operation by an optical pickup in a focus-on and track-off state to read signals from an optical disc; producing track-cross signals and mirror signals on the basis of the read signals; counting a number of the track-cross signals, and a number of the mirror signals; and discriminating a kind of the optical disc on the basis of a ratio between the number of the track-cross signals and the number of the mirror signals.

3. The method of discriminating optical discs according to claim 2, wherein the scanning operation by said optical pickup is performed by moving said optical pickup along a standing wave form with respect to a radial direction of the optical disc.

4. The method of discriminating optical discs according to claim 2, wherein a comparison level is lowered by a predetermined value in said step of producing the mirror signals.

5. The method of discriminating optical discs according to claim 2, wherein a hysteresis range of a comparison level is increased by a predetermined value in said step of producing the mirror signals.

* * * * *